United States Patent
Kobayashi

(10) Patent No.: US 10,254,137 B2
(45) Date of Patent: Apr. 9, 2019

(54) PHOTOELECTRIC ENCODER FOR DECONCENTRATING CALCULATION LOAD AND REDUCING POWER CONSUMPTION AND MEASURING INSTRUMENT INCLUDING THEREOF

(71) Applicant: Mitutoyo Corporation, Kawasaki, Kanagawa (JP)

(72) Inventor: Hirokazu Kobayashi, Saitama (JP)

(73) Assignee: MITUTOYO CORPORATION, Kawasaki (JP)

( * ) Notice: Subject to any disclaimer, the term of this patent is extended or adjusted under 35 U.S.C. 154(b) by 134 days.

(21) Appl. No.: 15/372,578

(22) Filed: Dec. 8, 2016

(65) Prior Publication Data

US 2017/0176220 A1    Jun. 22, 2017

(30) Foreign Application Priority Data

Dec. 21, 2015  (JP) .................. 2015-249117

(51) Int. Cl.
*G01D 5/347* (2006.01)

(52) U.S. Cl.
CPC .................. *G01D 5/34776* (2013.01)

(58) Field of Classification Search
CPC .......... G01D 5/34776; G01D 5/34784; G01D 5/34723; G01D 5/34715; G01D 5/34746; G01D 5/347

See application file for complete search history.

(56) References Cited

U.S. PATENT DOCUMENTS

| 4,079,251 A * | 3/1978 | Osann, Jr. ................. G01D 5/36 250/231.16 |
| 8,525,101 B2 * | 9/2013 | Jahnke .................. G01D 5/3473 250/231.13 |
| 2001/0001540 A1 * | 5/2001 | Okamuro ............... G01D 5/244 324/644 |
| 2002/0111763 A1 * | 8/2002 | Koga ................... B62D 15/021 702/151 |
| 2015/0060653 A1 | 3/2015 | Yaku et al. |

FOREIGN PATENT DOCUMENTS

| JP | 02231523 A * | 9/1990 |
| JP | 2013096756 A * | 5/2013 |
| JP | 2015-049167 | 3/2015 |

* cited by examiner

*Primary Examiner* — Que Tan Le
*Assistant Examiner* — Jennifer D Bennett
(74) *Attorney, Agent, or Firm* — Rankin, Hill & Clark LLP

(57) ABSTRACT

A photoelectric encoder includes light receiving units configured to output a plurality of photocurrent signals obtained by receiving light emitted from a light emission unit, via a scale, a signal conversion unit configured to output a conversion signal by converting the plurality of photocurrent signals, a position calculation unit configured to calculate an absolute position based on the conversion signal, and a microcomputer configured to perform drive control of the light emission unit, the signal conversion unit, and the position calculation unit. The microcomputer intermittently drives at least either one of the light emission unit and the signal conversion unit, and causes the position calculation unit to execute calculation according to a timing of intermit driving.

12 Claims, 9 Drawing Sheets

PHOTOELECTRIC ENCODER FOR DECONCENTRATING CALCULATION LOAD AND REDUCING POWER CONSUMPTION AND MEASURING INSTRUMENT INCLUDING THEREOF

CROSS-REFERENCE TO RELATED APPLICATION

This non-provisional application claims priority under 35 U.S.C. § 119(a) from Japanese Patent Application No. 2015-249117, filed on Dec. 21, 2015, the entire contents of which are incorporated herein by reference.

BACKGROUND OF THE INVENTION

Field of the Invention

The present invention relates to a photoelectric encoder and a measuring instrument, and particularly relates to an absolute-type photoelectric encoder that can detect an absolute position of an object to be measured, and a measuring instrument including this photoelectric encoder.

Description of the Related Art

There has been conventionally known a photoelectric encoder that calculates a measurement result for detecting a position, an angle, and the like of an object to be measured, by emitting light onto a scale, reading the amount of change in light that passes through this scale, using a light receiving unit, and calculating position information based on an electrical signal output from the light receiving unit.

Such encoders include an incremental-type encoder (hereinafter, may be referred to as an INC encoder) and an absolute-type encoder (hereinafter, may be referred as an ABS encoder), which differ from each other in position detection method.

An INC encoder employs a relative position detection method of detecting a measurement position from 1 type of periodic signals or a plurality of signals shifted in phase with 1 type of period. In the relative position detection method, it is necessary to keep detecting signals from an origin to a measurement position consecutively. Thus, if power or the like is turned off, position information is lost. It is therefore necessary to perform zero setting when power is input again. In the zero setting, a position of an origin is set.

On the other hand, an ABS encoder employs an absolute position detection method of detecting a measurement position from a synthesized signal obtained by synthesizing a plurality of signals different in period. In the absolute position detection method, position information is acquired by the calculation that is based on the synthesized signal. It is therefore unnecessary to perform zero setting.

As an absolute position detection method in a photoelectric ABS encoder, there is proposed a method of performing absolute position calculation by detecting pseudorandom data based on an interference fringes (scale pattern) generated by emitting light from a light emission unit onto a scale including an INC pattern and an ABS pattern (e.g., refer to JP 2015-049167 A), and the like.

SUMMARY OF THE INVENTION

Nevertheless, in conventional photoelectric ABS encoders, because an absolute position is constantly calculated from a synthesized signal, there is such a problem that calculation is more complicated as compared with an INC encoder, and a calculation load is large. In addition, there is such a problem that power consumption is large because power is constantly supplied to the light emission unit, each circuit, and the like during the measurement.

The object of the present invention is to provide a photoelectric encoder and a measuring instrument that can deconcentrate a calculation load in a photoelectric ABS encoder, and reduce power consumption.

A photoelectric encoder according to the present invention is an absolute-type photoelectric encoder including a light receiving unit configured to output a plurality of photocurrent signals obtained by receiving light emitted from a light emission unit, via a scale, a signal conversion unit configured to output a conversion signal by converting the plurality of photocurrent signals, and a position calculation unit configured to calculate an absolute position based on the conversion signal, and the photoelectric encoder includes a control unit configured to perform drive control of the light emission unit, the signal conversion unit, and the position calculation unit, and the control unit intermittently drives at least either one of the light emission unit and the signal conversion unit, and causes the position calculation unit to execute calculation according to a timing of intermittent driving.

According to the present invention as described above, in a photoelectric ABS encoder that calculates an absolute position based on a conversion signal synthesized by the signal conversion unit from a plurality of photocurrent signals, by intermittently driving the light emission unit and/or the signal conversion unit, power consumption can be reduced.

In other words, because it is unnecessary for the ABS encoder to perform zero setting, intermittent sampling of detecting a signal as necessary can be performed without consecutively performing sampling of position information. Thus, by intermittently driving the light emission unit and/or the signal conversion unit to stop power supply when sampling is not performed, power consumption can be reduced.

In addition, because conventional photoelectric encoders constantly perform sampling and calculate position information, there is such a problem that a calculation load is large. Nevertheless, according to the present invention, because the position calculation unit is caused to execute calculation of position information according to a timing of intermittent driving of the light emission unit and/or the signal conversion unit, a load applied by calculation can be deconcentrated.

In this case, the signal conversion unit preferably includes a sample-and-hold circuit.

With such a configuration, by the sample-and-hold circuit temporarily holding a voltage converted from the photocurrent signals, even if the signal conversion unit is intermittently driven and power supply is stopped, a conversion signal can be output to the position calculation unit without losing a voltage during the stop, so that calculation of position information can be stably executed by the position calculation unit. In addition, by outputting the conversion signal based on the voltage held by using the sample-and-hold circuit, the timings of intermittent driving of the entire photoelectric encoder can be synchronized, and position information can be surely acquired.

In addition, it is preferable that the photoelectric encoder according to the present invention further includes a light amount detection unit configured to output a light amount signal based on the photocurrent signals from the light receiving unit, a light amount calculation unit configured to calculate a light amount of the light emission unit based on the light amount signal, and a current control unit configured to control current to be supplied to the light emission unit, and the control unit performs drive control of the light amount detection unit, the light amount calculation unit, and the current control unit, and causes the current control unit to execute current control to the light emission unit according to a light amount of the light emission unit that has been calculated by the light amount calculation unit.

At this time, if a light amount of the light emission unit is not sufficient during measurement, it is concerned that the photoelectric encoder cannot accurately read a photocurrent signal, and a measurement error is caused. Nevertheless, with such a configuration, even if a light amount of the light emission unit varies, by the current control unit controlling current to be supplied to the light emission unit, based on a calculation result of the light amount calculation unit, a light amount of the light emission unit can be kept constant, and a stable light amount can be obtained, so that a measurement error can be suppressed.

At this time, it is preferable that the control unit intermittently drives the light amount detection unit, and causes the light amount calculation unit to execute calculation according to a timing of intermit driving.

With such a configuration, by intermittently driving the light amount detection unit, power supply can be stopped when the light amount detection unit does not perform light amount sampling. Power consumption can be thereby reduced.

At this time, it is preferable that the current control unit controls current to be supplied to the light emission unit, by setting a current value based on control information in which the current value and a control value are defined by a linear function passing through an origin of coordinates (the point of intersection of coordinate axes), and using a range from a predetermined lower limit larger than an origin in the control value, to an upper limit.

With such a configuration, the current control unit varies the current value within a certain range from the predetermined lower limit larger than the origin in the control value, to the upper limit. Thus, a variation rate of the control value of 1 count becomes smaller, and a change rate of the current value also becomes smaller. For example, in the case of using a control value defined by 0 to 255, which is 8-bit digital values, if a current value is varied within a limited range from, for example, an intermediate value (128) serving as a predetermined lower limit, to an upper limit (255), a variation rate of the control value of 1 count becomes smaller as compared with the case of varying the current value using the entire range from the origin (0) to the upper limit (255). Thus, when current to be supplied is adjusted according to a variation in light amount of the light emission unit, stable current control of the light emission unit with less rapid change in current value can be executed.

Furthermore, it is preferable that the control information includes upper control information in which the current value is set in a range of the large current value, and lower control information in which the current value is set in a range of the current value smaller than that in the upper control information, and the current control unit is configured to set the current value by shifting between the upper control information and the lower control information, and in the case of increasing the current value, the current control unit shifts a value from an upper limit of the control value in the lower control information, to a control value larger than a lower limit of the control value in the upper control information, and in the case of decreasing the current value, the current control unit shifts a value from a lower limit of the control value in the upper control information, to a control value smaller than an upper limit of the control value in the lower control information.

With such a configuration, when the current value is set by shifting between the lower control information and the upper control information, a route for shifting from the lower control information to the upper control information, and a route for shifting from the upper control information to the lower control information are not overlapping, and a loop-shaped shift route (hysteresis) is obtained, so consequently, a shift frequency of the control information can be suppressed. Thus, in the case of shifting between the pieces of control information, that is, for example, in a case in which control information is configured to be switched by a digital variable resistor, power consumption required for switching can be suppressed, consequently, power saving can be further promoted.

In addition, the control unit is preferably configured to be able to change a timing of intermittently driving the light emission unit and the signal conversion unit.

With such a configuration, an intermittent driving period and a sampling timing can be changed in accordance with a use status of the photoelectric encoder. Thus, the photoelectric encoder that can handle various use statuses can be provided. For example, in the case of using the photoelectric encoder as a hand tool, power saving can be achieved by setting an intermittent driving period to a relatively-long time. On the other hand, in the case of intermittent driving that requires real-time property, an intermittent driving period can also be set to be short.

In addition, the light emission unit preferably includes an LED as a light source.

With such a configuration, by using a light emitting diode (LED) as a light source of the light emission unit, downsizing and power saving can be achieved, and the photoelectric encoder can be applied to a hand tool such as, for example, a caliper and a micrometer.

In addition, the LED has a property of deteriorating according to the total used hours. Thus, by intermittently driving the LED, the total light emission time can be reduced. Thus, a longer operating life of the LED can be realized, and furthermore, heating of the LED can be suppressed by intermittent driving.

Here, because the LED has a variation in light amount, and the light amount tends to decrease as being deteriorated, it is concerned that the decrease in light amount deteriorates the detection accuracy of the photoelectric encoder. In the case of using such an LED as a light source, if current to be supplied to the light emission unit is configured to be controlled by providing the current control unit, even if there is a variation in light amount of the LED, and the light amount decreases, a stable light amount can be obtained, so that the detection accuracy can be favorably maintained.

A measuring instrument according to the present invention is characterized by including the photoelectric encoder.

According to the measuring instrument of the present invention as described above, because the above-described photoelectric encoder is included, power saving can be achieved.

At this time, it is preferable to include a display unit configured to display position information calculated by the position calculation unit.

With such a configuration, a result such as a position measured by the photoelectric encoder can be promptly checked. Thus, the present invention is suitable for a measuring instrument of a hand tool or the like.

DETAILED DESCRIPTION OF THE EMBODIMENTS

An embodiment of the present invention will be described below based on the drawings.

Figure 1:
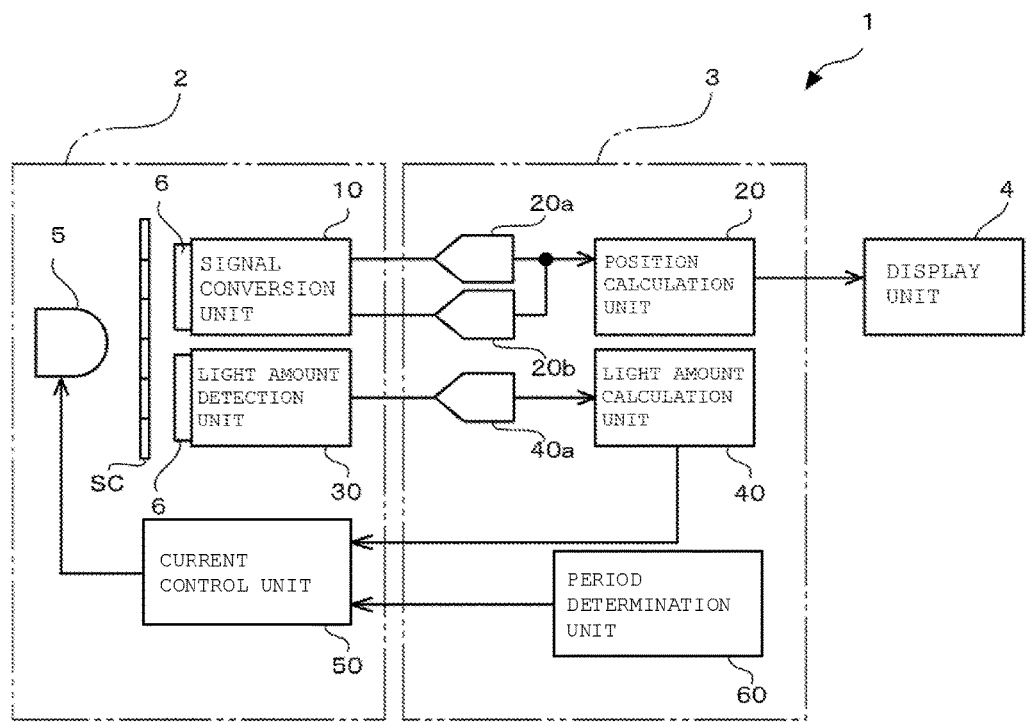
FIG. 1 is a schematic configuration diagram of a measuring instrument according to an embodiment of the present invention.

FIG. 1 is a schematic configuration diagram of a measuring instrument according to an embodiment of the present invention.

As illustrated in FIG. 1, a measuring instrument 1 includes a detection unit 2 that detects a relative movement amount of an object to be measured, a microcomputer 3 serving as a control unit that controls the detection unit 2, and a display unit 4 that displays various types of information such as a relative movement amount.

The display unit 4 is, for example, a small panel or the like of a 7-segment liquid crystal display (LCD).

The detection unit 2 includes a scale SC, a light emission unit 5 that emits light onto the scale SC, and two light receiving units 6 that receive light emitted from the light emission unit 5 and transmitted through the scale SC, to output a photocurrent signal.

Furthermore, the detection unit 2 includes a signal conversion unit 10 that outputs a conversion signal based on the photocurrent signal output from one of the light receiving units 6, a light amount detection unit 30 that outputs a light amount signal based on the photocurrent signal output from the other one of the light receiving units 6, and a current control unit 50 that controls current to be supplied to the light emission unit 5.

The microcomputer 3 includes analog-digital converters (ADCs) 20a and 20b that A/D (analog to digital)-convert the conversion signal output from the signal conversion unit 10 and output the signal to a position calculation unit 20, the position calculation unit 20 that calculates position information based on the A/D-converted conversion signal, an ADC 40a that A/D-converts a light amount signal output from the light amount detection unit 30, and outputs the signal to a light amount calculation unit 40, the light amount calculation unit 40 that calculates light amount information based on the A/D-converted light amount signal, and a period determination unit 60 that outputs a change command of a timing of intermittently driving the detection unit 2, and causes the current control unit 50 to change an intermittent driving period of the detection unit 2.

For example, based on an input from an input unit such as a button (not illustrated) and a dial (not illustrated) that is provided in the measuring instrument 1, the period determination unit 60 can change a timing of intermittently driving the detection unit 2, according to a use status.

The detection unit 2 and the microcomputer 3 as described above constitute the photoelectric encoder of the present invention.

Figure 2:
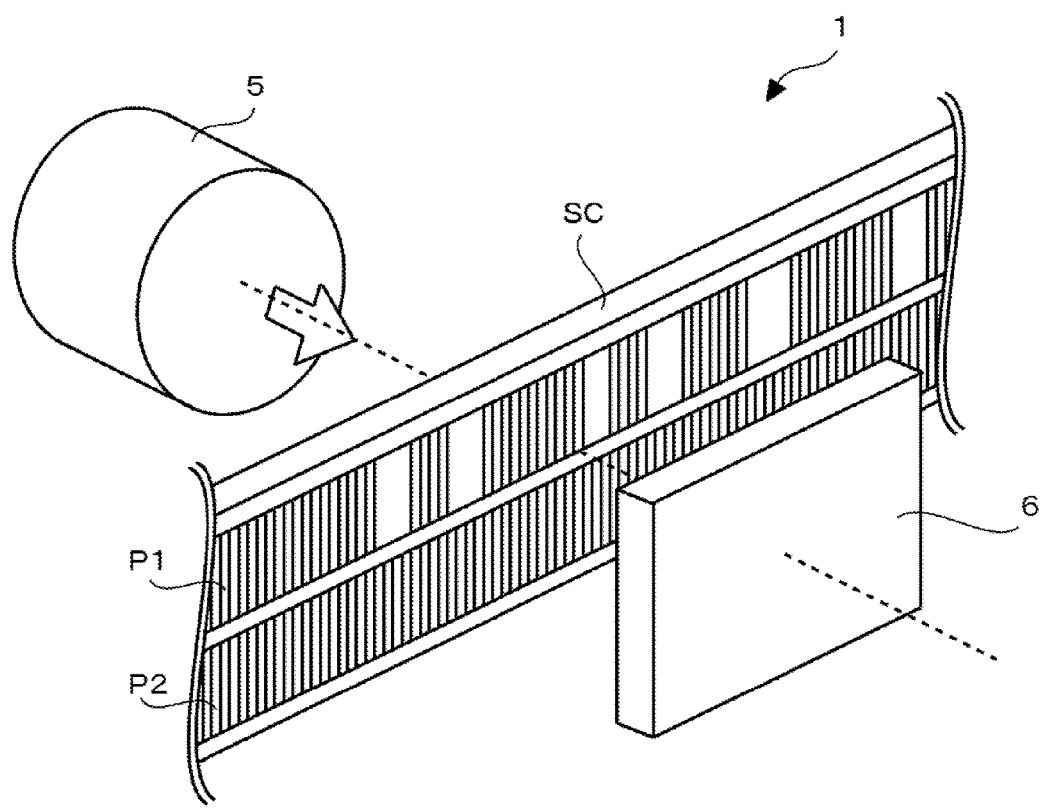
FIG. 2 is a diagram illustrating a part of a photoelectric encoder in the measuring instrument.

FIG. 2 is a diagram illustrating a part of a photoelectric encoder in the measuring instrument. Specifically, FIG. 2 is a diagram illustrating the scale SC, the light emission unit 5, and the light receiving units 6, which constitute a part of the detection unit 2.

The light emission unit 5 includes an LED as a light source. The scale SC transmits light emitted from the light emission unit 5 to convert into a scale pattern.

As illustrated in FIG. 2, the light emission unit 5 and the light receiving units 6 are disposed in such a manner as to sandwich the scale SC, and photocurrent signals acquired by the light receiving units 6 are output to the signal conversion unit 10 and the light amount detection unit 30.

The light emission unit 5 is disposed at a position where the light transmitted through the scale SC is emitted onto the light receiving unit 6. The light emission unit 5 and the light receiving units 6 are provided so as to be relatively movable to the scale SC in the longitudinal direction of the scale SC.

The scale SC transmits light from the light emission unit 5, via graduations P1 and P2 having patterns different from each other, and converts the light into transmitted light containing scale patterns. Specifically, the graduation P1 is an ABS pattern, and the graduation P2 is an INC pattern. By receiving the transmitted light generated by the graduations P1 and P2, and executing various calculations, absolute position detection can be performed.

The light receiving units 6 receive transmitted light from the scale SC that contains scale patterns, convert the received light into photocurrent signals, and output the photocurrent signals to the signal conversion unit 10 and the light amount detection unit 30.

Here, the light receiving units 6 include 4 light receiving elements 6a, 6b, 6c, and 6d (refer to FIG. 3) corresponding to the graduations P1 and P2, and read a plurality of photocurrent signals generated based on the graduations P1 and P2.

Figure 3:
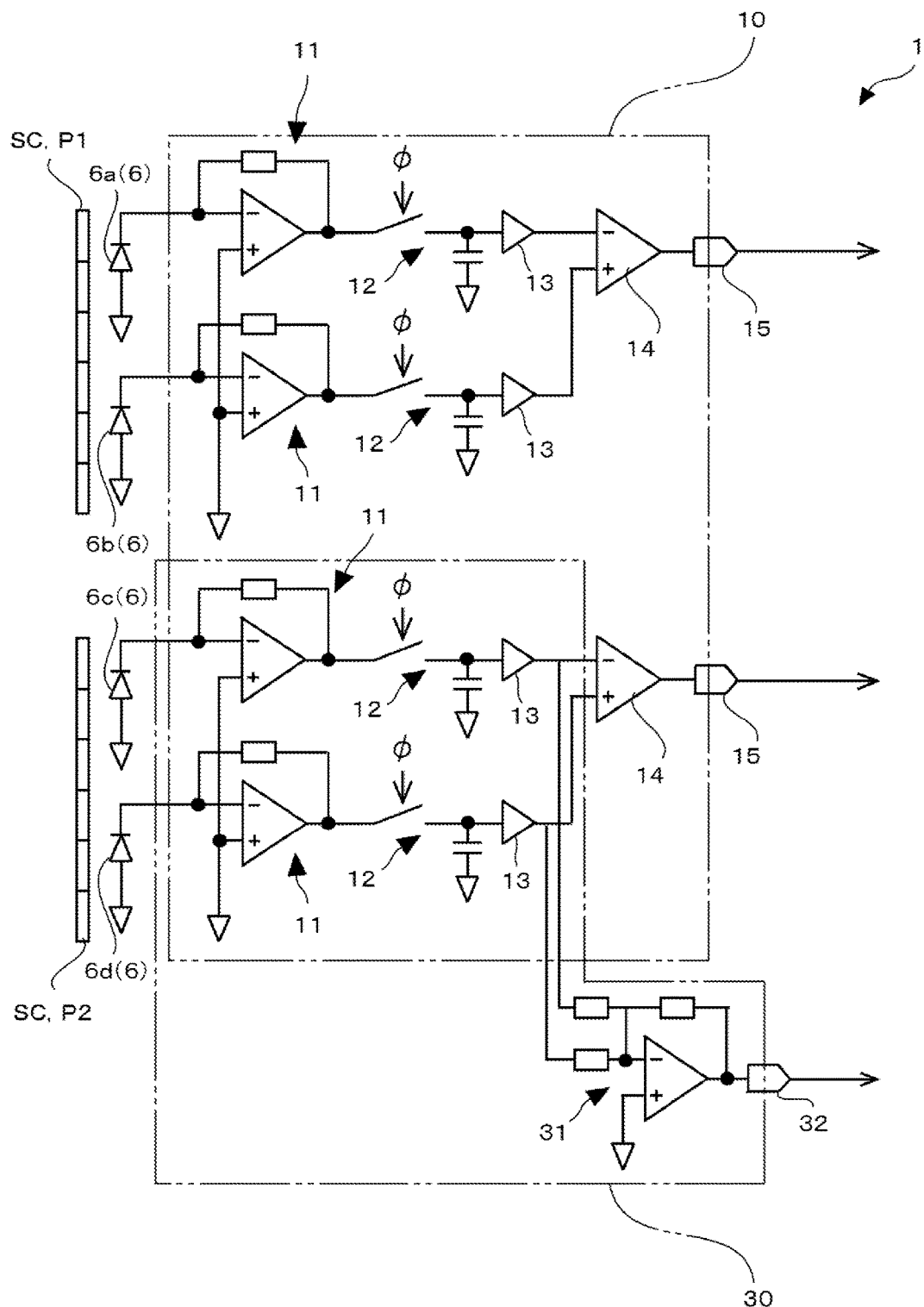
FIG. 3 is a circuit diagram illustrating a detection circuit of the photoelectric encoder.

FIG. 3 is a circuit diagram illustrating a detection circuit serving as a signal conversion unit and a light amount detection unit, which constitute a part of the photoelectric encoder.

As illustrated in FIG. 3, photocurrent signals output from the light receiving units 6 are sent to the signal conversion unit 10 and the light amount detection unit 30. Specifically, the light receiving elements 6a and 6b corresponding to the graduation P1 respectively output photocurrent signals being different in phase by 0 degree and 180 degrees, to the signal conversion unit 10, and the light receiving elements 6c and 6d corresponding to the graduation P2 respectively output photocurrent signals being different in phase by 0 degree and 180 degrees, to the signal conversion unit 10 and the light amount detection unit 30.

The signal conversion unit 10 includes current voltage circuits 11 that convert photocurrent signals output from the light receiving units 6, into voltages, sample-and-hold circuits 12 each including a switch and a capacitor, buffers 13 that are provided in case wirings become longer, differential circuits 14 that remove noise in the voltages converted by the respective current voltage circuits 11, and connector terminals 15 that connect the differential circuits 14 and the position calculation units 20.

Here, the light receiving elements 6a and 6b, and the current voltage circuits 11, the sample-and-hold circuits 12, and the buffers 13 that correspond to the respective light receiving elements 6a and 6b are provided so as to correspond to the graduation P1, and the light receiving elements 6c and 6d, and the current voltage circuits 11, the sample-and-hold circuits 12, and the buffers 13 that correspond to the respective light receiving elements 6c and 6d are provided so as to correspond to the graduation P2.

The signal conversion unit 10 synthesizes the difference of the photocurrent signals being different in phase from 0 degree and 180 degrees that have been output from the light receiving elements 6a and 6b, using one of the differential circuits 14, and synthesizes the difference of the photocurrent signals being different in phase from 0 degree and 180 degrees that have been output from the light receiving elements 6c and 6d, using the other one of the differential circuits 14, and outputs these two conversion signals obtained by synthesizing the photocurrent signals, to the position calculation unit 20.

The light amount detection unit 30 includes the current voltage circuits 11, the sample-and-hold circuits 12, and the buffers 13, which constitute a part of the signal conversion unit 10, an adder circuit 31 that adds and synthesizes two voltages from the current voltage circuits 11, and a connector terminal 32 that connects the adder circuit 31 and the light amount calculation unit 40.

Here, the part of the signal conversion unit 10 refers to a part of the signal conversion unit 10 that corresponds to the graduation P2, and is constituted by the current voltage circuits 11, the sample-and-hold circuits 12, and the buffers 13 that correspond to the respective light receiving elements 6c and 6d. By adding and synthesizing, using the adder circuit 31, photocurrent signals being different in phase by 0 degree and 180 degrees that have been output from the light receiving elements 6c and 6d, the light amount detection unit 30 obtains a light amount signal, and outputs this light amount signal to the light amount calculation unit 40.

Upon receiving a hold signal φ, the sample-and-hold circuit 12 temporarily holds a voltage converted by the current voltage circuit 11, in the capacitor. The voltage held in the capacitor is output to the differential circuit 14 and the adder circuit 31.

In addition, the sample-and-hold circuit is sometimes used when stable calculation is desired to be surely performed, in an ABS encoder or the like, for temporarily holding a sampled voltage.

As illustrated in FIG. 1, two conversion signals output from the signal conversion unit 10 are converted by the ADCs 20a and 20b of the microcomputer 3 into digital signals, and then the digital signals are synthesized and input to the position calculation unit 20. Specifically, the ADC 20a converts the conversion signal that is based on photocurrent signals from the light receiving elements 6a and 6b corresponding to the graduation P1, into a digital signal, and the ADC 20b converts the conversion signal that is based on photocurrent signals from the light receiving elements 6c and 6d corresponding to the graduation P2, into a digital signal. The position calculation unit 20 calculates an absolute position serving as position information, by executing calculation based on the conversion signals, and outputs the calculated absolute position to the display unit 4. The light amount signal output from the light amount detection unit 30 is converted by the ADC 40a of the microcomputer 3 into a digital signal, and then the digital signal is input to the light amount calculation unit 40. the light amount calculation unit 40 executes calculation based on the light amount signal to calculate light amount information being a present light amount for comparing with a preset light amount reference value, and outputs the calculated light amount information to the current control unit 50.

Figure 4:
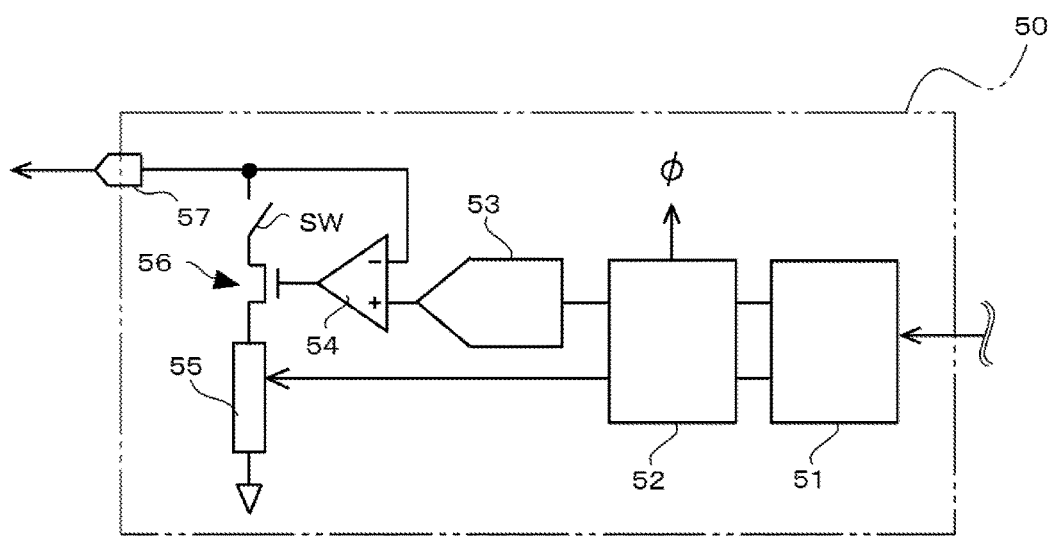
FIG. 4 is a circuit diagram illustrating a current control circuit of the photoelectric encoder.

FIG. 4 is a circuit diagram illustrating a current control circuit serving as a current control unit constituting a part of the photoelectric encoder.

The current control unit 50 includes a communication means 51 that receives the light amount information from the light amount calculation unit 40 (refer to FIG. 1), and issues various control commands or performs communication, a register/logic controller 52 that outputs a hold signal cp and a control command of intermittent driving, a digital-analog converter (DAC) 53 that executes light amount feedback to be described later, based on a command from the register/logic controller 52, an operational amplifier 54, a digital variable resistor 55, an MOS driver 56 including a switch SW that intermittently turns ON/OFF current to the light emission unit 5, and a connector terminal 57 that connects the current control unit 50 and the light emission unit 5.

Based on a control command from the communication means 51, the register/logic controller 52 outputs a hold signal cp to the sample-and-hold circuit 12. Furthermore, the register/logic controller 52 also outputs a command for intermittently driving the light emission unit 5, to the MOS driver 56.

Figure 5:
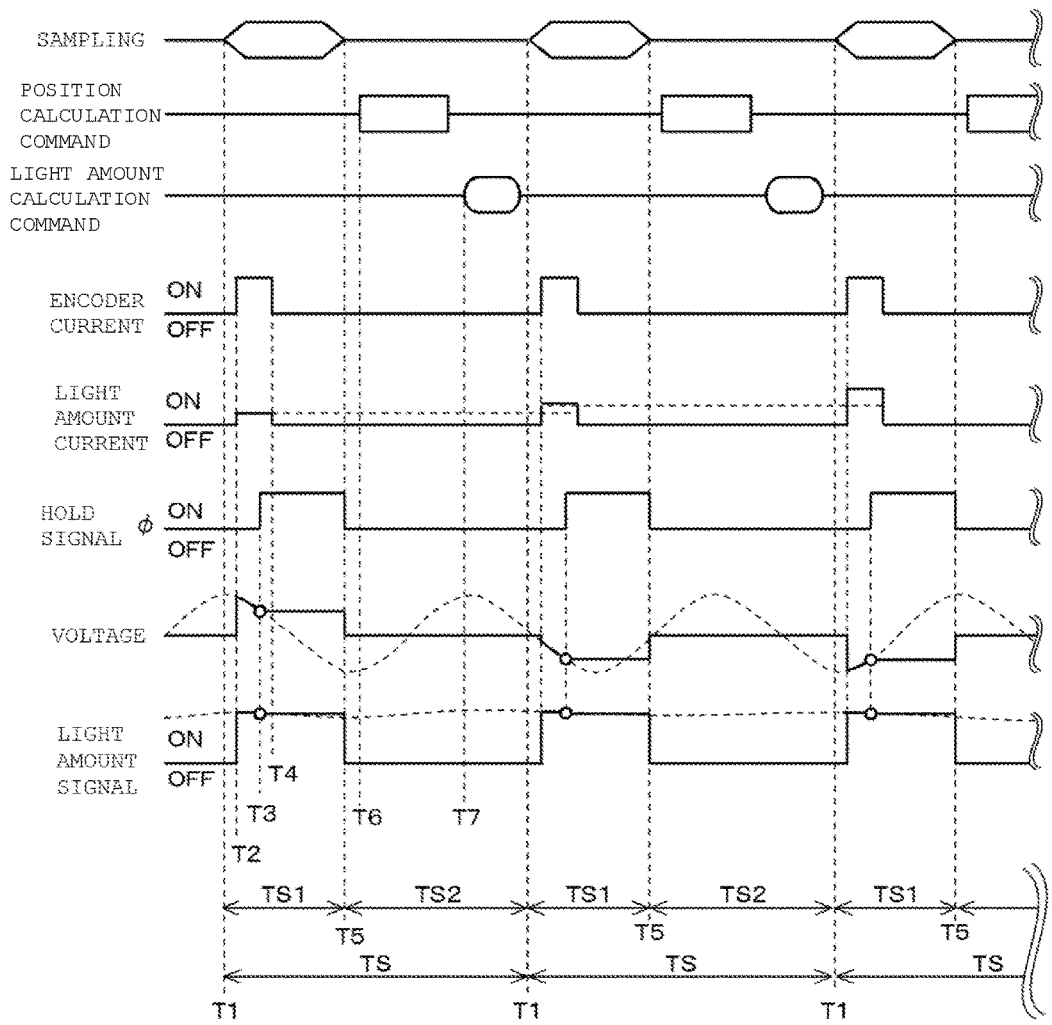
FIG. 5 is a timing chart illustrating an operation of the photoelectric encoder.
Figure 6:
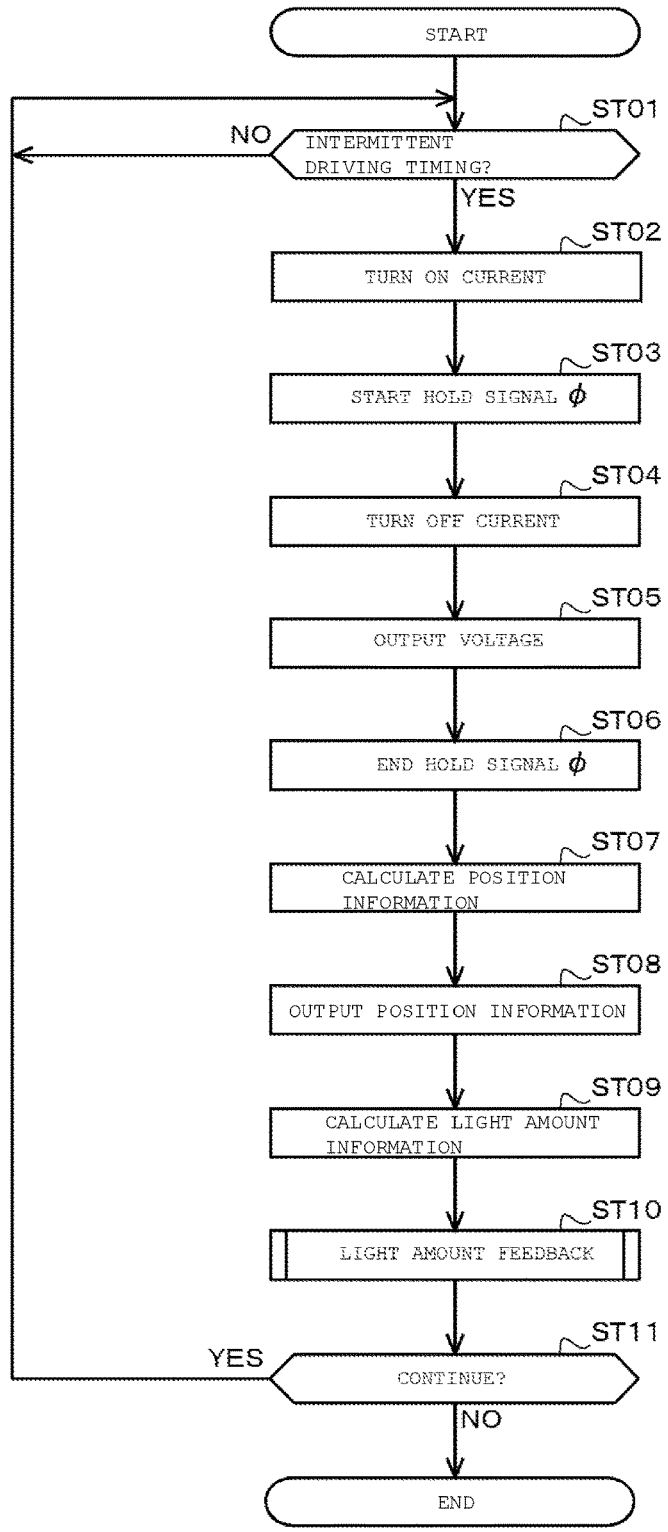
FIG. 6 is a flowchart illustrating a driving method of the photoelectric encoder.

FIG. 5 is a timing chart illustrating an operation of the photoelectric encoder, and FIG. 6 is a flowchart illustrating an intermittent driving method of the photoelectric encoder.

As illustrated in FIG. 5, the timing chart includes an intermittent driving period TS, a sampling period TS1, and a calculation period TS2. The detection unit 2 is intermittently driven under the control of the microcomputer 3. An intermittent driving method of the detection unit 2 will be described below with reference to FIGS. 5 and 6.

First, power of the measuring instrument 1 is turned ON, and power is supplied to the microcomputer 3, so as to enter a state in which measurement can be performed.

At a time T1, the microcomputer 3 determines a timing of intermittent driving. Specifically, the microcomputer 3 determines whether it is an intermittent driving timing, based on the intermittent driving period TS set by the period determination unit 60 and stored in a memory, and a time measurement result obtained by an internal timer (step ST01). If the microcomputer 3 determines that it is not an intermittent driving timing (NO in step ST01), the microcomputer 3 waits until the time when the microcomputer 3 determines next whether it is an intermittent driving timing.

If the microcomputer 3 determines in step ST01 that it is an intermittent driving timing (YES in step ST01), at a time T2, current to be supplied to the detection unit 2 is turned ON (step ST02). As a result, first, power is supplied to an LED of the light emission unit 5 that had been turned off, and the LED is lit. Furthermore, power is supplied to a part of the detection unit 2 that is other than the light emission unit 5, and the part is turned ON, so that the light receiving units 6 receive light containing scale patterns generated via the scale SC. The light receiving units 6 convert the scale patterns into photocurrent signals, and output the photocurrent signals to the current voltage circuits 11.

Subsequently, at a time T3, the register/logic controller 52 outputs a hold signal cp to the sample-and-hold circuit 12, and the sample-and-hold circuit 12 is operated. The sample-and-hold circuit 12 follows the voltage converted by the current voltage circuit 11 from the photocurrent signal (step ST03). Subsequently, at a time T4, the current supplied to the detection unit 2 is turned OFF. At this time, the sample-and-hold circuit 12 holds the voltage from the current voltage circuit 11 that is obtained at the moment when current is turned OFF at the time T4, in the capacitor (step ST04). The sample-and-hold circuit 12 outputs the held voltage to the differential circuit 14 and the adder circuit 31 (step ST05). Then, at a time T5, the sample-and-hold circuit 12 stops simultaneously with the turning off of the hold signal φ (step ST06).

In the sampling period TS1 from the above-described times T1 to T5, a detection process including steps ST01 to ST06 is executed.

Subsequently, the microcomputer 3 issues instructions to the respective units at appropriate timings so as to perform various calculations based on the conversion signal and the light amount signal synthesized by the differential circuit 14 and the adder circuit 31.

First, at a time T6, the microcomputer 3 outputs a position calculation command to the position calculation unit 20. The position calculation unit 20 calculates position information based on the conversion signal output from the signal conversion unit 10 (step ST07). Then, the position calculation unit 20 outputs the position information to the display unit 4, thereby displaying the position information on the display unit 4 (step ST08).

Next, at a time T7, the microcomputer 3 outputs a light amount calculation command to the light amount calculation unit 40. The light amount calculation unit 40 calculates light amount information (step ST09) based on the light amount signal output from the light amount detection unit 30, and based on the light amount information, feeds back a light amount to the light emission unit 5 (step ST10).

In the calculation period TS2 from the above-described times T5 to T7, a calculation process including steps ST07 to ST10 is executed.

A light amount feedback process in step ST09 will be described later.

If the calculation process in the calculation period TS2 is ended, and measurement is to be continued (YES in step ST11), the microcomputer 3 returns to step ST01, and determines a timing of intermittent driving again at the time T1. If the measurement performed by the measuring instrument 1 is stopped and ended, and intermittent driving is ended (NO in step ST11), the processing is ended.

As described above, the microcomputer 3 causes the detection unit 2 to execute intermittent driving by using the intermittent driving period TS including the sampling period TS1 and the calculation period TS2, as 1 cycle.

Figure 7:
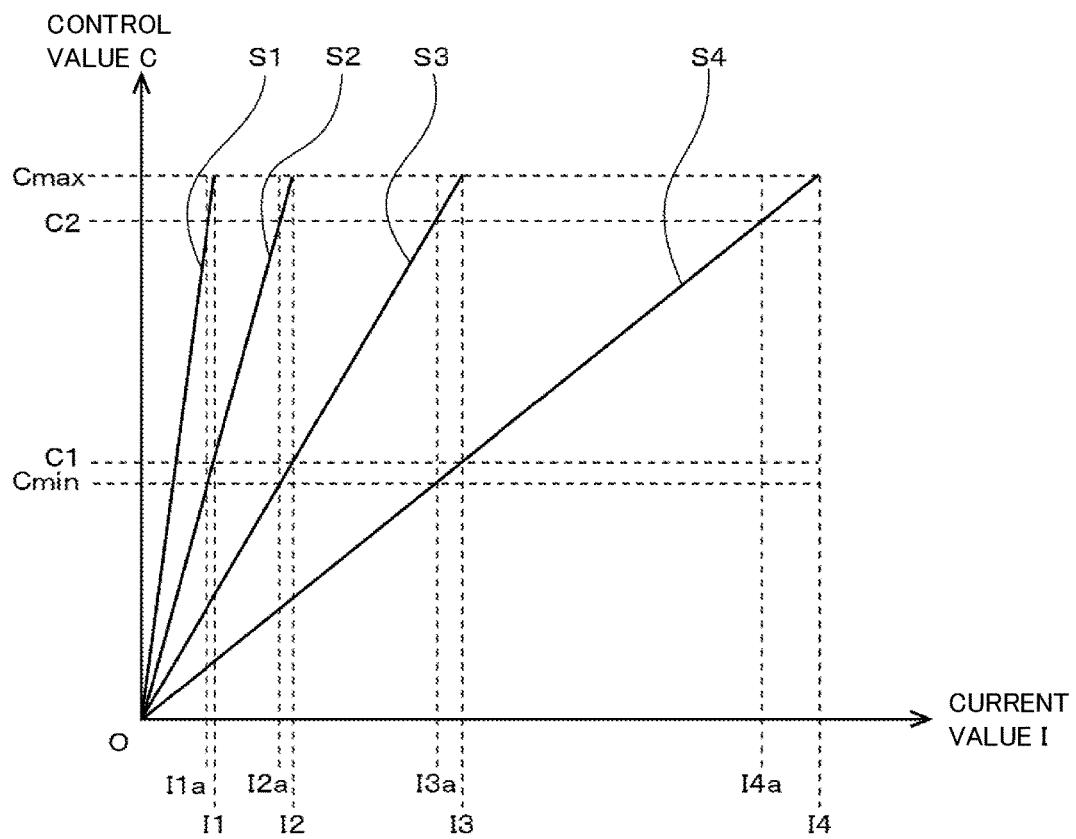
FIG. 7 is a diagram illustrating a graph used for current adjustment in the photoelectric encoder.

FIG. 7 is a diagram illustrating a graph used for current adjustment in the photoelectric encoder.

Specifically, FIG. 7 illustrates a graph related to the switching of a resistance value of the digital variable resistor 55 in the current control unit 50.

The graph illustrated in FIG. 7 includes a control value C being a vertical axis, a current value I being a horizontal axis, and control information pieces S1 to S4 in which current values I and control values C are defined by linear functions passing through an origin O.

The control value C is defined by, for example, numerical values from 0 to 255 being 8-bit digital values. The control value C defines the current value I to be supplied to the light emission unit 5, by being output from the register/logic controller 52 to the DAC 53, and sent to the operational amplifier 54 after being converted by the DAC 53 into an analog value. As the control values C, a predetermined lower limit Cmin (e.g., 128 being an intermediate value), an upper limit Cmax (e.g., 255), a value C1 a bit larger than the predetermined lower limit Cmin (e.g., a value larger than 128 by 10%), and a value C2 a bit smaller than the upper limit Cmax (e.g., a value smaller than 255 by 10%) are defined.

The plurality of pieces of control information S1 to S4 is defined so as to correspond to a resistance value of the digital variable resistor 55 that gradually varies, and the control information shifts from the control information S1 to the control information S2, for example, by the switching of the resistance value of the digital variable resistor 55.

In addition, as the pieces of control information S1 to S4 become larger, larger current values I are obtained. In other words, in the control information S1, even when the control value C reaches the upper limit Cmax, only a current value I1 can be obtained. Nevertheless, if the control information shifts from the control information S1 to the control information S2, when the control value C reaches the upper limit Cmax, a current value I2 can be obtained. Furthermore, if the control information shifts from the control information S2 to the control information S3, and from the control information S3 to the control information S4, in the graph illustrated in FIG. 7, a value up to a current value I4 can be obtained.

A specific method for switching a resistance value of the digital variable resistor 55 in the present embodiment will be described with reference to FIGS. 8A, 8B, and 9.

Figure 8A:
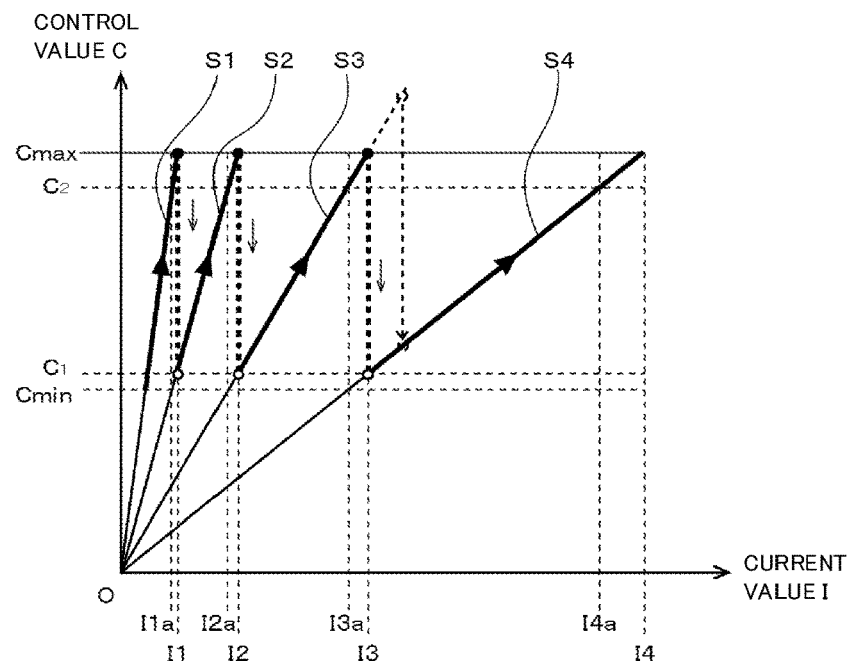
FIGS. 8A and 8B are diagrams illustrating a current change in current adjustment in the photoelectric encoder.
Figure 8B:
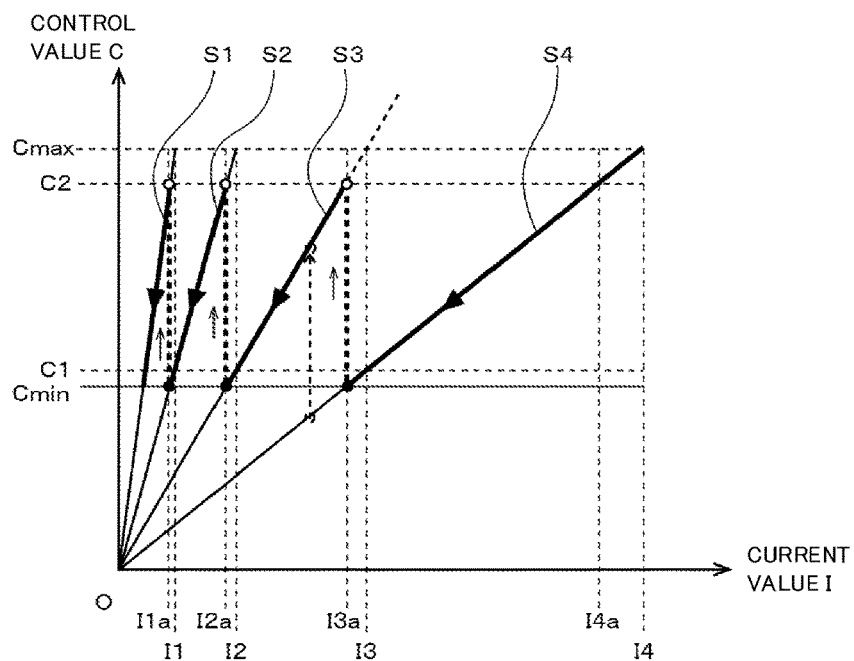

FIGS. 8A and 8B are diagrams illustrating a current change in current adjustment in the photoelectric encoder. FIG. 9 is a flowchart illustrating a current adjustment method (step ST10 in FIG. 6: light amount feedback) of the photoelectric encoder.

In addition, FIG. 8A is a diagram illustrating a switching method of a resistance value of the digital variable resistor that is performed when a current value is increased in accordance with a decrease in light amount of the light emission unit 5. In addition, FIG. 8B is a diagram illustrating a switching method of a resistance value of the digital variable resistor that is performed when a current value is decreased in accordance with an increase in light amount of the light emission unit 5.

Figure 9:
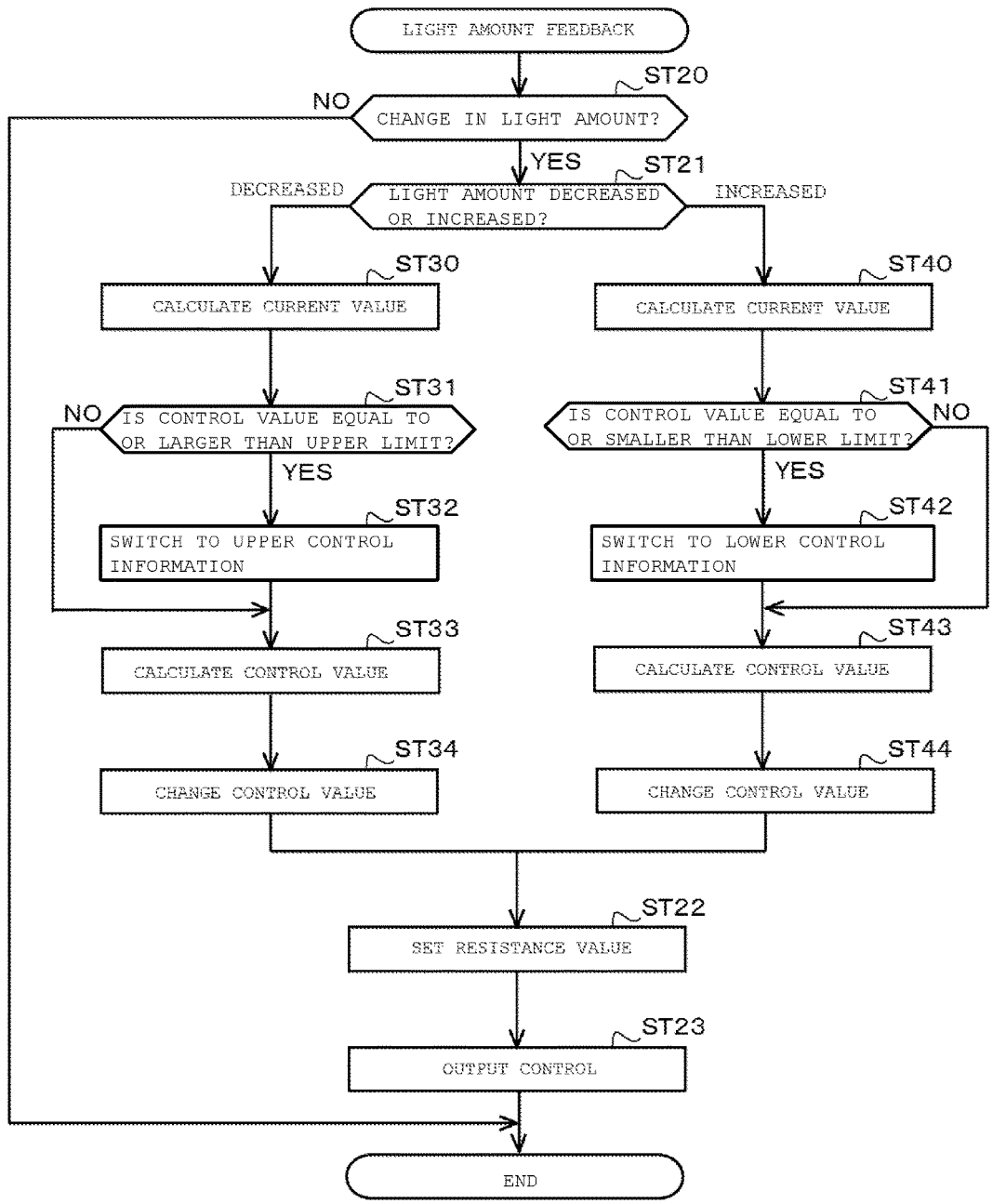
FIG. 9 is a flowchart a current adjustment method of the photoelectric encoder.

As illustrated in FIG. 9, first, the register/logic controller 52 determines whether there is a change in light amount, based on the light amount information calculated by the light amount calculation unit 40 (step ST20). If there is a change in light amount (YES in step ST20), subsequently, it is determined whether the light amount has decreased or increased (step ST21). If there is no change in light amount (NO in step ST20), current adjustment is not performed.

If the register/logic controller 52 determines that the light amount has decreased, the register/logic controller 52 executes steps ST30 to ST34. If the register/logic controller 52 determines that the light amount has increased, the register/logic controller 52 executes steps ST40 to ST44. Steps ST30 to ST34 and steps ST40 to ST44 will be described later with reference to FIGS. 8A and 8B.

After performing calculation in steps ST30 to ST34 or in steps ST40 to ST44, the register/logic controller 52 sets a resistance value of the digital variable resistor 55 based on the calculation result (step ST22).

Subsequently, the register/logic controller 52 outputs the control value C to the DAC 53 (step ST23), and changes current to be supplied to the light emission unit 5.

Next, referring to FIG. 8A, the case in which the register/logic controller 52 determines that the light amount has decreased (steps ST30 to ST34) will be described.

If the register/logic controller 52 determines that the light amount has decreased ("decreased" in step ST21), based on the light amount information from the light amount calculation unit 40, the register/logic controller 52 calculates a current value I required for setting a light amount of the light emission unit 5 to a predetermined light amount (step ST30).

Here, if a current value I set before the calculation is on the control information S3, if the current value I calculated by the register/logic controller 52 is smaller than a current value I3 corresponding to the upper limit Cmax of the control value C on the control information S3 (NO in step ST31), the register/logic controller 52 calculates a control value C on the control information S3 that corresponds to the calculated current value I (step ST33), and the register/logic controller 52 changes the control value C (step ST34).

On the other hand, if the current value I calculated by the register/logic controller 52 is equal to or larger than the current value I3 corresponding to the upper limit Cmax on the control information S3 (YES in step ST31), the control value C shifts from the control information S3 being lower control information to the control information S4 being upper control information (step ST32). At this time, the control value C shifting between the control information pieces S3 and S4 shifts to the control information S4 at the control value C1 larger than the predetermined lower limit (broken-line downward arrow), without varying to the origin O or the predetermined lower limit Cmin. After calculating the control value C (step ST33), the register/logic controller 52 changes the control value C (step ST34).

In accordance with the shift of the control value C to the control information S4, in step ST22, the digital variable resistor 55 sets a resistance value so as to switch to the upper control information.

Next, referring to FIG. 8B, the case in which the register/logic controller 52 determines that the light amount has increased (steps ST40 to ST44) will be described.

If the register/logic controller 52 determines that the light amount has increased ("increased" in step ST21), based on the light amount information from the light amount calculation unit 40, the register/logic controller 52 calculates a current value I required for setting a light amount of the light emission unit 5 to a predetermined light amount (step ST40).

Here, if a current value I set before the calculation is on the control information S4, if the current value I calculated by the register/logic controller 52 is larger than the current value I3a corresponding to the predetermined lower limit Cmin of the control value C on the control information S4 (NO in step ST41), the register/logic controller 52 calculates a control value C on the control information S4 that corresponds to the calculated current value I (step ST43), and the register/logic controller 52 changes the control value C (step ST44).

On the other hand, if the current value I calculated by the register/logic controller 52 is equal to or smaller than the current value I3a corresponding to the predetermined lower limit Cmin on the control information S4 (YES in step ST41), the control value C shifts from the control information S4 being upper control information to the control information S3 being lower control information (step ST42). At this time, the control value C shifting between the control information pieces shifts to the control information S3 at the predetermined lower limit Cmin (broken-line upward arrow), without varying to the origin O or below the predetermined lower limit Cmin. After calculating the control value C (step ST43), the register/logic controller 52 changes the control value C (step ST44).

In accordance with the shift of the control value C to the control information S3, in step ST22, the digital variable resistor 55 sets a resistance value so as to switch to the lower control information.

In this manner, by setting the upper limit Cmax and the predetermined lower limit Cmin, and shifting between the lower control information (e.g., control information S3) and the upper control information (e.g., control information S4), a loop-shaped shift route (hysteresis) can be obtained.

In other words, when the current value I is set, a route for shifting from the lower control information to the upper control information through the control value C1 a bit larger than the predetermined lower limit, and a route for shifting from the upper control information to the lower control information through the control value C2 a bit smaller than the upper limit are not overlapping. A hysteresis can be obtained by going through different shift routes when shifting from the upper control information to the lower control information, and shifting from the lower control information to the upper control information. Thus, a shift frequency of control information, i.e., a switching frequency of a resistance value of the digital variable resistor 55 can be suppressed. The power consumption required for switching a resistance value of the digital variable resistor 55 can be accordingly suppressed, so that power saving can be achieved.

Current to be supplied to the light emission unit 5 is adjusted by the resistance value of the digital variable resistor 55 and the control value C that have been calculated through the above procedure. In this manner, by adjusting current to be supplied to the light emission unit 5, based on the light amount information calculated by the light amount calculation unit 40, light amount feedback of keeping the light amount of the light emission unit 5 constant is realized.

According to the present embodiment as described above, the following functions and effects can be brought about.

(1) By intermittently driving at least either one of the light emission unit 5 and the signal conversion unit 10, the microcomputer 3 can reduce power consumption.

(2) By causing the position calculation unit 20 to execute calculation according to intermittent driving, and synchronizing the timings of sampling and calculation, a load applied by calculation can be deconcentrated.

(3) By the sample-and-hold circuit 12 temporarily holding a voltage converted by the current voltage circuit 11 from the photocurrent signals, even if the signal conversion unit 10 is intermittently driven and power supply is stopped, a conversion signal can be output to the position calculation unit 20 without losing a voltage during the stop, and accordingly, calculation of position information can be stably executed by the position calculation unit 20. In addition, by outputting the conversion signal based on the voltage held by using the sample-and-hold circuit 12, the timings of intermittent driving of the entire photoelectric encoder can be synchronized, and position information can be surely acquired.

(4) Even if a light amount of the light emission unit 5 varies, by the current control unit 50 controlling current to be supplied to the light emission unit 5, based on a calculation result of the light amount calculation unit 40, a light amount of the light emission unit 5 can be kept constant, and a stable light amount can be obtained, so that a measurement error can be suppressed.

(5) The current control unit 50 varies the current value I within a certain range from the predetermined lower limit Cmin larger than the origin O in the control value C, to the upper limit Cmax. Thus, a variation rate of the control value of 1 count becomes smaller, and a change rate of the current value I also becomes smaller. As a result, when current to be supplied is adjusted according to a variation in light amount of the light emission unit 5, stable light amount feedback with less rapid change in the current value I can be executed.

(6) When the current value I is set by shifting between the lower control information (e.g., control information S3) and the upper control information (e.g., control information S4), a route for shifting from the lower control information to the upper control information, and a route for shifting from the upper control information to the lower control information are not overlapping, and a hysteresis is obtained, so that a shift frequency of the control information can be suppressed. As a result, power consumption required for switching a resistance value of the digital variable resistor 55 that corresponds to control information can be suppressed, and power saving can be further promoted.

(7) The intermittent driving period TS and a sampling timing can be changed in accordance with a use status of the photoelectric encoder. Thus, the photoelectric encoder that can handle various use statuses can be provided. In the case of using the photoelectric encoder as a hand tool, by setting the intermittent driving period TS to a relatively-long time, power saving can be achieved. On the other hand, in the case of intermittent driving that requires real-time property, the intermittent driving period TS can also be set to be short.

(8) By including the period determination unit 60, the setting of the intermittent driving period can be promptly changed as necessary. Thus, the intermittent driving period can be set to a relatively-long time, or the intermittent driving period can be set to be short to such an extent that real-time property can be obtained. It accordingly becomes unnecessary to prepare a photoelectric encoder according to a use status. This leads to cost savings.

(9) By using an LED as a light source of the light emission unit 5, downsizing and power saving can be achieved, and the photoelectric encoder can be applied to a hand tool such as, for example, a caliper and a micrometer. In addition, the LED has a property of deteriorating according to the total used hours. Thus, by intermittently driving the LED, the total used hours can be reduced. Thus, a longer operating life of the LED can be realized, and furthermore, heating of the LED can be suppressed by intermittent driving.

(10) If current to be supplied to the light emission unit 5 is controlled by providing the current control unit 50, even if there is a variation in light amount of the LED, and the light amount decreases, a stable light amount can be obtained. Thus, the detection accuracy can be favorably maintained.

(11) By including the display unit 4, a result such as a position measured by the photoelectric encoder can be promptly checked. Thus, the present invention is suitable for a measuring instrument of a hand tool or the like, such as, for example, a caliper and a micrometer.

Modification of Embodiment

In addition, the present invention is not limited to the embodiment, and modifications, improvements, and the like within a scope in which the object of the present invention can be achieved are included in the present invention.

For example, in the embodiment, the light emission unit 5 and the signal conversion unit 10 are intermittently driven. Nevertheless, only either one of them may be intermittently driven. In addition, the light amount detection unit 30 is similarly intermittently driven at a synchronized timing with the light emission unit 5 and the signal conversion unit 10. Nevertheless, the light amount detection unit 30 does not have to be intermittently driven.

In addition, in the embodiment, the sampling period TS1, a position calculation command to the position calculation unit 20, a light amount calculation command to the light amount calculation unit 40, and a timing of each calculation are shifted. Nevertheless, all the calculations may be concurrently executed. In addition, each calculation command does not have to be issued for every period of the intermittent driving period TS, and calculation may be executed at any timing. For example, calculation may be executed in alternate periods.

In the embodiment, the sample-and-hold circuit 12 is used for surely calculating position information. Nevertheless, it is sufficient that the position calculation unit 20 can calculate a conversion signal in the microcomputer 3. Thus, the sample-and-hold circuit 12 does not have to be used. In addition, a hold signal cp for controlling the sample-and-hold circuit 12 based on a control command from the communication means 51 is output by the register/logic controller 52. Alternatively, the hold signal cp may be output by the microcomputer 3.

In the embodiment, the light amount detection unit 30 is constituted by the current voltage circuits 11, the sample-and-hold circuits 12, and the buffers 13, which constitute a part of the signal conversion unit 10, and correspond to the graduation P2. Nevertheless, the light amount detection unit 30 may be constituted by the current voltage circuits 11, the sample-and-hold circuits 12, and the buffers 13 that correspond to the graduation P1.

The light amount feedback is executed by the current control unit 50. Nevertheless, the light amount feedback may be executed by the microcomputer 3 as a program.

In the embodiment, the current control unit 50 varies the control value C on the certain control information pieces S1 to S4 from the predetermined lower limit Cmin to the upper limit Cmax. Nevertheless, the current control unit 50 may vary the control value C after setting only either one of them. More specifically, only the predetermined lower limit Cmin may be set, or only the upper limit Cmax may be set. The predetermined lower limit Cmin and the upper limit Cmax do not have to be set. In addition, the four pieces of control information S1 to S4 for varying or shifting the control value C are set. Nevertheless, the number of pieces of control information may be increased or decreased according to the setting of the digital variable resistor 55, or control information does not have to be used.

In the embodiment, the measuring instrument 1 includes the period determination unit 60 that changes an intermittent driving period and a sampling timing according to a usage situation thereof. Nevertheless, the measuring instrument 1 does not have to be provided with a timing change function, and the setting may be fixed at the time of manufacture of the measuring instrument 1.

In the embodiment, the microcomputer 3 includes the period determination unit 60. Nevertheless, the period determination unit 60 may be preinstalled on the current control unit 50 as a program. Alternatively, the measuring instrument 1 does not have to include the period determination unit 60. Furthermore, the intermittent driving period may be switched automatically or switched at every certain period, in addition to being switched by a button or the like.

In the embodiment, an LED is used as a light source of the light emission unit 5. Nevertheless, any light source may be used instead of the LED.

Position information obtained from the measuring instrument 1 does not necessarily be displayed on the display unit 4, and may be displayed on another display or the like in a wired manner or wirelessly. Alternatively, the position information may be displayed on another display device, or may be simply recorded as data.

In the embodiment, the description has been given assuming a linear encoder. Nevertheless, the photoelectric encoder may be a rotary encoder. The type of the photoelectric encoder of the present invention is not especially limited.

The light receiving units 6 receive light transmitted through the scale SC. Alternatively, the light receiving units 6 may receive light reflected on the scale SC, and a light receiving method of the light receiving units 6 is not especially limited.

The graduation P1 of the scale SC has an ABS pattern, and the graduation P2 has an INC pattern. Alternatively, the graduation P1 may have an INC pattern, and the graduation P2 may have an ABS pattern. Furthermore, both the graduations P1 and P2 have an ABS pattern, and a third graduation may be provided in addition to the graduations P1 and P2. The configuration of the scale is not especially limited as long as the scale is the one used in a photoelectric ABS encoder.

INDUSTRIAL APPLICABILITY

As described above, the present invention can be preferably used for a photoelectric encoder and a measuring instrument that require reduction in calculation load and power consumption.

What is claimed is:

1. An absolute-type photoelectric encoder including a light receiving unit configured to output a plurality of photocurrent signals obtained by receiving light emitted from a light emission unit, via a scale, a signal conversion unit configured to output a conversion signal by converting the plurality of photocurrent signals, and a position calculation unit configured to calculate an absolute position based on the conversion signal, the photoelectric encoder comprising:
a control unit configured to perform drive control of the light emission unit, the signal conversion unit, and the position calculation unit,
wherein the control unit intermittently drives at least either one of the light emission unit and the signal conversion unit, and causes the position calculation unit to execute calculation according to a timing of intermittent driving, and
wherein the control unit stops power supply to the at least either one of the light emission unit and the signal conversion unit during at least a time period in which the control unit causes the position calculation unit to execute calculation of the absolute position.

2. The photoelectric encoder according to claim 1, wherein the signal conversion unit includes a sample-and-hold circuit.

3. The photoelectric encoder according to claim 1, further comprising:
a light amount detection unit configured to output a light amount signal based on the photocurrent signals from the light receiving unit;
a light amount calculation unit configured to calculate a light amount of the light emission unit based on the light amount signal; and
a current control unit configured to control current to be supplied to the light emission unit, wherein the control unit performs drive control of the light amount detection unit, the light amount calculation unit, and the current control unit, and
wherein the control unit causes the current control unit to execute current control to the light emission unit according to a light amount of the light emission unit that has been calculated by the light amount calculation unit.

4. The photoelectric encoder according to claim 3, wherein the control unit intermittently drives the light amount detection unit, and causes the light amount calculation unit to execute calculation according to a timing of intermit driving.

5. The photoelectric encoder according to claim 3, wherein the current control unit controls current to be supplied to the light emission unit, by setting a current value based on control information in which the current value and a control value are defined by a linear function passing through an origin, and using a range from a predetermined lower limit larger than an origin in the control value, to an upper limit.

6. The photoelectric encoder according to claim 5, wherein the control information includes upper control information in which the current value is set in a range of the large current value, and lower control information in which the current value is set in a range of the current value smaller than that in the upper control information,
wherein the current control unit is configured to set the current value by shifting between the upper control information and the lower control information,
wherein, in the case of increasing the current value, the current control unit shifts a value from an upper limit of the control value in the lower control information, to a control value larger than a lower limit of the control value in the upper control information, and
wherein, in the case of decreasing the current value, the current control unit shifts a value from a lower limit of the control value in the upper control information, to a control value smaller than an upper limit of the control value in the lower control information.

7. The photoelectric encoder according to claim 1, wherein the control unit is configured to be able to change a timing of intermittently driving the light emission unit and the signal conversion unit.

8. The photoelectric encoder according to claim 1, wherein the light emission unit includes an LED as a light source.

9. A measuring instrument including the photoelectric encoder according to claim 1.

10. The measuring instrument according to claim 9, further comprising a display unit configured to display position information calculated by the position calculation unit.

11. An absolute-type photoelectric encoder including a light receiving unit configured to output a plurality of photocurrent signals obtained by receiving light emitted from a light emission unit, via a scale, a signal conversion unit configured to output a conversion signal by converting the plurality of photocurrent signals, and a position calculation unit configured to calculate an absolute position based on the conversion signal, the photoelectric encoder comprising:
a control unit configured to perform drive control of the light emission unit, the signal conversion unit, and the position calculation unit;

a light amount detection unit configured to output a light amount signal based on the photocurrent signals from the light receiving unit;

a light amount calculation unit configured to calculate a light amount of the light emission unit based on the light amount signal; and a current control unit configured to control current to be supplied to the light emission unit, wherein the control unit intermittently drives at least either one of the light emission unit and the signal conversion unit, and causes the position calculation unit to execute calculation according to a timing of intermittent driving, wherein the control unit performs drive control of the light amount detection unit, the light amount calculation unit, and the current control unit, wherein the control unit causes the current control unit to execute current control to the light emission unit according to a light amount of the light emission unit that has been calculated by the light amount calculation unit, and wherein the current control unit controls current to be supplied to the light emission unit, by setting a current value based on control information in which the current value and a control value are defined by a linear function passing through an origin, and using a range from a predetermined lower limit larger than an origin in the control value, to an upper limit.

12. The photoelectric encoder according to claim 11, wherein the control information includes upper control information in which the current value is set in a range of the large current value, and lower control information in which the current value is set in a range of the current value smaller than that in the upper control information, wherein the current control unit is configured to set the current value by shifting between the upper control information and the lower control information, wherein, in the case of increasing the current value, the current control unit shifts a value from an upper limit of the control value in the lower control information, to a control value larger than a lower limit of the control value in the upper control information, and wherein, in the case of decreasing the current value, the current control unit shifts a value from a lower limit of the control value in the upper control information, to a control value smaller than an upper limit of the control value in the lower control information.

* * * * *